(12) United States Patent
Mashinsky et al.

(10) Patent No.: US 7,945,502 B2
(45) Date of Patent: May 17, 2011

(54) ONLINE TRADING AND DYNAMIC ROUTING OF ELECTRIC POWER AMONG ELECTRIC SERVICE PROVIDERS

(75) Inventors: Alex Mashinsky, New York, NY (US); Chi K. Eng, Wayne, NJ (US)

(73) Assignee: AIP Acquisition LLC, Fort Lee, NY (US)

( * ) Notice: Subject to any disclaimer, the term of this patent is extended or adjusted under 35 U.S.C. 154(b) by 2335 days.

(21) Appl. No.: 09/939,917

(22) Filed: Aug. 27, 2001

(65) Prior Publication Data

US 2002/0046155 A1 Apr. 18, 2002

Related U.S. Application Data

(60) Provisional application No. 60/228,275, filed on Aug. 25, 2000.

(51) Int. Cl.
*G06Q 40/00* (2006.01)

(52) U.S. Cl. .................... 705/37; 705/35; 705/36 R
(58) Field of Classification Search ................ 705/38, 705/37, 35, 36 R
See application file for complete search history.

(56) References Cited

U.S. PATENT DOCUMENTS

| | | | | |
|---|---|---|---|---|
| 5,873,251 A | * | 2/1999 | Iino | 60/660 |
| 6,598,029 B1 | * | 7/2003 | Johnson et al. | 705/37 |

* cited by examiner

*Primary Examiner* — Lalita M Hamilton
(74) *Attorney, Agent, or Firm* — Cohen Pontani Lieberman & Pavane LLP

(57) ABSTRACT

A method and system for trading electric power on a spot market and dynamically matches bids and asks and routes the electric power in accordance with the matches to effect the settled trades. A control node is arranged for receiving bids and asks via a wide area network. The control node is also connected to a transmission system and a central control of the transmission system to dynamically switch the transmission system to effect the matched bids and asks.

20 Claims, 2 Drawing Sheets

ONLINE TRADING AND DYNAMIC ROUTING OF ELECTRIC POWER AMONG ELECTRIC SERVICE PROVIDERS

RELATED APPLICATIONS

This application claims priority from U.S. Provisional Patent Application Ser. No. 60/228,275 which was filed on Aug. 25, 2000.

BACKGROUND OF THE INVENTION

1. Field of the Invention

The present invention relates to electronic commerce and, in particular, a method and system for the trading of electricity services and dynamic routing of electric power based on settled trades.

2. Description of the Related Art

The North American power grid is an interconnected system of many regional power grids, i.e., electric power transmission and distribution systems. Each transmission and power distribution system is traditionally owned and operated by an electric utility and includes a generating system, a transmission system, a distribution system, and a control center. The interconnection of the transmission systems forms the power grid and permits the interchange of electricity between the various electric utilities. The electric utilities have generally operated as vertically integrated local monopolies by producing or purchasing electric power to serve all the users within the geographic boundaries of their transmission and distribution system. Presently, almost all end users purchase electric power from their local electric utilities serving their geographic areas.

The control center of each regional power grid monitors the generating plants, transmission systems, distribution systems, and customer loads. The control center may also provide automatic control of field equipment, for example, in response to an emergency shutdown of a generating facility.

Recent Federal legislative and regulatory activities and market place forces are significantly changing the electric power industry such that the traditional monopolistic attributes of electric utilities are yielding to free market forces. Several states have adopted legislations to deregulate the electric power industry. The legisation has created three types of participants within each transmission and distribution system previously controlled by one vertically integrated electric utility: electric power generators, transmission companies, and distribution companies.

One of the primary aims of electric power deregulation efforts is to reduce energy prices to customers by introducing competition among power generators and other service providers (Power generators include resellers or companies that own generating facilities). As competition increases, power generators are expected to offer prospective customers various pricing plans premised, for example, on volume and term commitments, and peak/off-peak usage.

Under current deregulation schemes, local distribution company facilities of the local electric utility will continue to be a government-regulated monopoly within the region it serves. These facilities are primarily the wires and other equipment constituting the local power grid over which electric power is transmitted to end user locations.

To date, an active wholesale market exists for electric power. Power generators, distribution companies, resellers, independent traders and brokers actively buy and sell electric power in a wholesale market. A power generator may wish to sell excess generating capacity not required for its own operations or not contractually committed to any customer, or may need to purchase additional power to satisfy its generating commitments. A local electric utility may need to sell excess generating capacity (from its own generating plants) or buy power from nearby utilities, resellers, traders or brokers to cover a shortfall in its own supply (e.g., during certain peak periods). Resellers and traders may need to fulfill take-or-pay or supply contracts they have with power generators, local utilities or each other or to trade derivatives based on speculation about the future price of power in the spot market.

Under the current scheme, consumers may make individual contracts with power suppliers or may group together in a power exchange to collectively buy power. An operator of the power exchange will assess the next day's power supply requirements by asking power generators (all entities willing to supply electric power to the exchange) to submit asking prices for specifies quantities of power to be delivered to the power grid during each hour of the next day. Starting with the lowest asking price, the exchange operator matches the assessed needs for power against the offered power on an hourly basis until it has sufficient power to meet the assessed needs.

In the wholesale power market, the power must be transferred over the interconnected transmission systems or regional power grids. Buyers typically take title to the purchased electric power at well-established interfaces or transfer points on a regional power grid (e.g., the Oregon-California border). However, the purchase arrangement may call for title to be passed at some alternate point, such as (i) the point on the regional grid nearest the seller's generating facility or (ii) if the buyer is a local distribution company, the point(s) on its local grid where the grid interfaces with the power grids of neighboring utilities. Before this power can be delivered to the buyer at the agreed transfer point, the seller must schedule a "contract path" for this power to travel from the seller's generating facility (or the point at which the seller is to take title if the seller purchased this power from another source) to the transfer point. The buyer must, in turn, schedule a transmission path from the transfer point to the buyer's own grid interface (if the buyer, for example, is a local distribution utility) or, if the buyer is reselling this power to another party, to a transfer point agreed to by such other party. Scheduling contract or transmission paths is usually coordinated through the regional grid controller(s) for the power grids over which this power is to be transmitted. The regional grid controller manages one or more local power grids, keeping demand on the combined grid in balance with available supply at all times. Generally, the affected power grids are those owned and controlled by the electric utilities whose service areas are situated between the source of this power and the transfer point. The charges for transmission of the purchased power to and from the point at which title is passed are normally borne by the seller and buyer, respectively.

The present control systems do not allow users to automatically and dynamically route electric power based on settled trades in the spot market. Accordingly, an online trading system is required for automatically and dynamically configuring an electric network to route electric power between buyers and sellers as well as performing clearinghouse or settlement functions for the buyers and sellers.

SUMMARY OF THE INVENTION

An object of the present invention is to provide a method and system for facilitating online trading of electric power and for dynamically routing the power based on settled trades in the spot market.

According to the present invention, a system enables buyers and sellers to electronically and anonymously trade electric power and physically deliver the purchased electric power in real time. The system also actively manages the reliability of the transmission network using a feedback control scheme, as it routes the electric power.

In a presently preferred embodiment, the system includes a control node, a switch controller, an electric network, and switching devices. The control node collects bids and asks from buyers and sellers of electric services through a wide-area network such as the Internet. The control node matches the bids and asks and produces a route plan, at predetermined periods of time, based on parameters specified in the matched bids and asks. In generating the route plan, the control node takes into account the supply and demand on the system by matching loads and resources of the system on a real-time basis.

The control node according to the present invention allows buyers to directly bid on the spot market power exchange and allows sellers to directly input asking prices for the power they supply so that the control node dynamically connects a buyer with the seller with the lowest asking price. If at a later time, another provider becomes available that has a lower asking price, the control node automatically switches to the new supplier. Of course all dynamic spot market buyers will want the provider with the lowest asking price. In one embodiment, the buyers connected to one node may equally share the power from the provider with the lowest available asking price. In this scenario, each user is supplied by various suppliers. Alternatively, the buyers may share the power from one provider in which the size of the share is based on the size of the power requirement of each buyer. For example, if there are only two buyers and the first buyer requires twice the amount of power as the second buyer, the first buyer receives ⅔ of the of power from the provider with the lowest asking price and the second buyer receives ⅓ of the power from that provider.

In a further embodiment, the buyers may be entitled to receive power from the lowest asking price provider based on some type of heirarchy. For example, the buyer with the highest demand for power may be entitled to the lowest asking price.

A switch controller of the transmission network receives the route plan from the control node and sends control signals to the switching devices on the electric network so as to route power from the sellers to the buyers according to the route plan. The electric network is responsive to electronic commands for routing power according to the route plan. The electric network may be configured as alternating current (A/C), direct current (D/C), or a hybrid (i.e. a combination of A/C and D/C) power transmission system.

In a particularly preferred embodiment, the electric network is configured as a high-voltage direct-current transmission system and the switching devices are semiconductor-based (e.g., silicon carbide) such that the flow and level of electric power can be controlled precisely and rapidly. The electric network further includes feedback sensors for monitoring the performance and efficiency of the network and for measuring actual supply and demand of electric power on the network. The control node receives measurements from the feedback sensors and adjusts the route plan and thus the power flow to various grids of the electric network so as to balance the load and resources on the network.

In one embodiment, the control node includes a deal maker module, a route plan generator, a feedback controller, a switch agent, and an accounting module. The deal-maker module uses conventional algorithms to match bids and asks from buyers and sellers. In the case where the bids and asks include pricing and scheduling information, the deal-maker module matches the bids and asks based on the pricing and scheduling information. The route plan generator produces a route plan based on the matched bids and asks. The switch agent executes the route plan by actuating the switching devices on the electric network. The feedback controller performs real-time balancing of load and power generation based on feedback data from the feedback sensors. The accounting module computes and settles the trades based on the buyers' usage of electric services as measured by the feedback sensors.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements.

DETAILED DESCRIPTION OF THE PRESENTLY PREFERRED EMBODIMENTS

Figure 1:
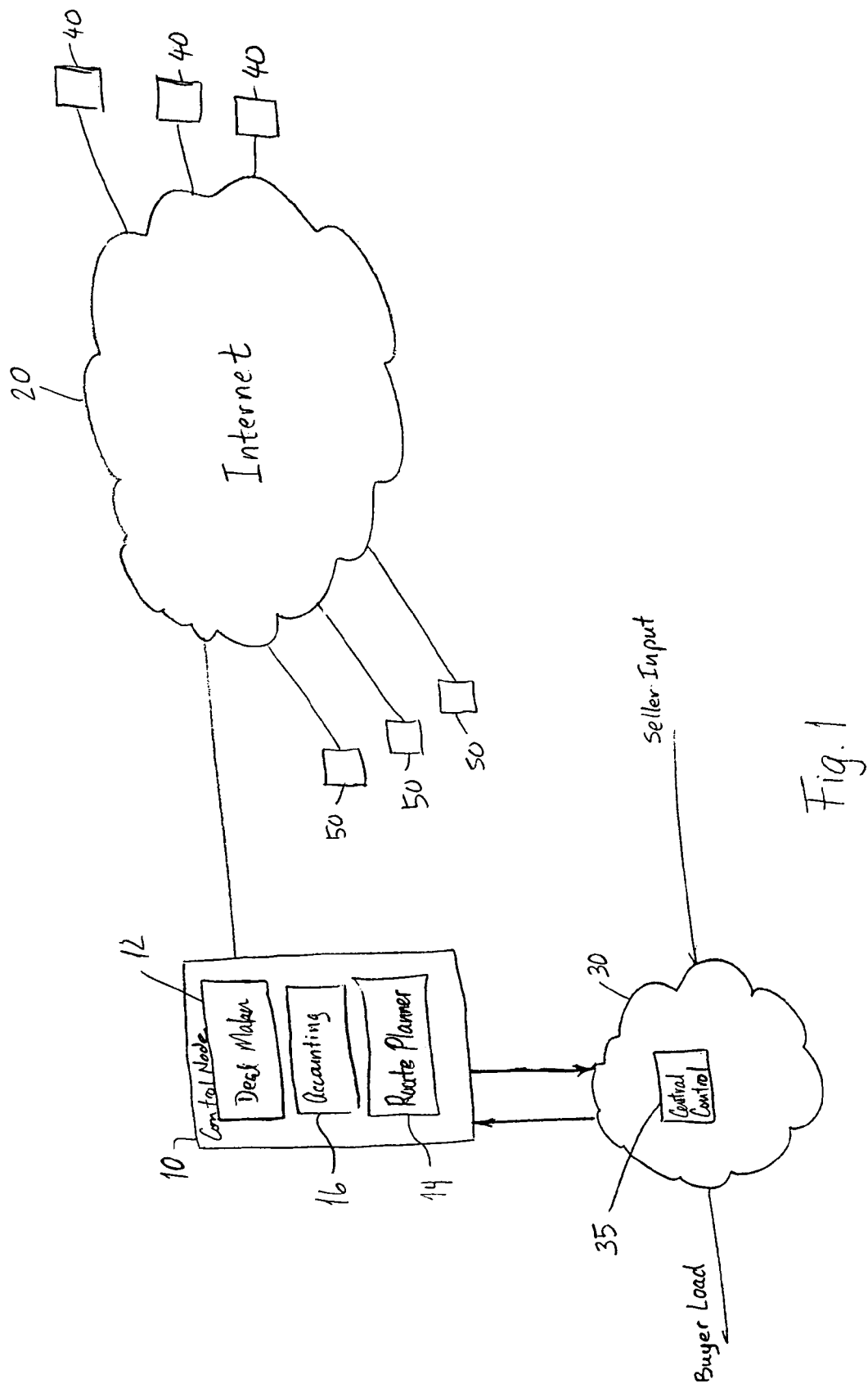
FIG. 1 is a block diagram of an embodiment of the trading system of the present invention.

FIG. 1 depicts a schematic diagram of an embodiment of the online trading system according to the present invention comprising a control node 10 connected to a wide area network such as the internet 20 and to an electric power transmission network 30. The electric power transmission network 30 includes a transmission network that conducts the flow of electricity from points of generation to points of distribution. In addition, the electric power transmission network may also include a distribution system that delivers the electric power to consumers.

According to the present invention, buyers use, for example, wireline or wireless terminals 40 to input bids and sellers use their own terminals 50 to input asks in a spot market. The control node 10 comprises a deal-maker module 12 which receives the bids and asks and determines matches. The bids and asks may be automatically input or manually input to the control node 10. For example, when a user turns on an air conditioning system the user terminal 40 may automatically input a bid for the required power.

The control node 10 further comprises a route planner 14 for generating a route plan for the settled trade, i.e., a matched bid and ask, and transmits the route plan for the matched bids and asks. The route planner 14 is connected to a dispatch center or central control 35 of the electric power transmission network 30 which provides supply and demand information to the route planner 14 via a feedback loop. Accordingly, the route planner 14 determines whether a matched bid and ask, i.e., settled trade, is possible based on the current supply and demand on the electric power transmission network 30. Once the route planner 14 determines that the settled trade is possible, the route planner 14 transmits the route to the central control 35 to implement the settled trade. The central control 35 controls a switch agent to make any switches necessary to deliver the seller (power generator) to the buyer (consumer) to effect the settled trade. Accordingly, the control node 10 matches loads and resources of the electric power system on a real time basis. An accounting module 16 computes and settles the trades based on the buyers' usage of electric services as measured by the feedback sensors.

The electric power transmission network 30 may comprise AC, DC, or a hybrid system. In a preferred embodiment, the electric power transmission network comprises a high-voltage direct-current (HVDC) system with switch devices including power semiconductors, i.e., thyristors, for switching power.

The deal-maker module 12 may optionally also consider scheduling information for generating conventional settled trades on an advanced basis.

Although the control node 10 is shown as separate from the central control 35 of the network, the control node 10 may be integrated in the central control 35.

Figure 2:
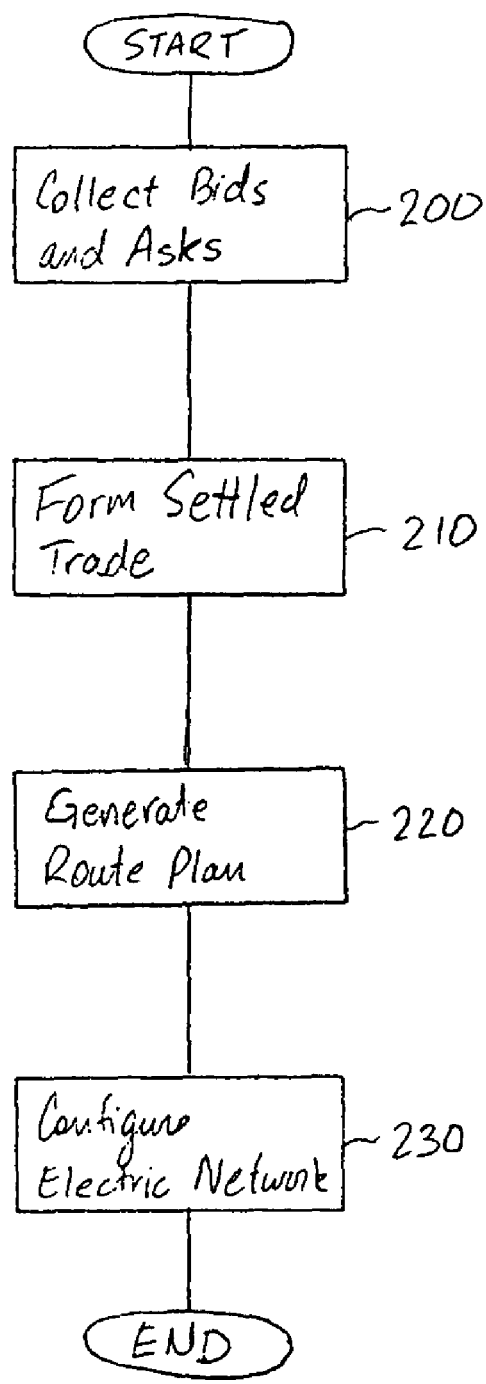
FIG. 2 is a flow diagram of a method for dynamically trading electric power according to the present invention.

Referring to FIG. 2, a method according to the present invention for facilitating trading of electric power includes collecting by the control node 10 bids and asks from buyers and sellers of electric power, step 200. The control node then matches the collected bids and asks to form a settled trade, step 210. The control node then generates a route plan based on the settled trade, step 220. If a route is available from the provider to the buyer, the control node configures an electric network to route electric power according to the generated route plan, step 230.

The control node according to the present invention allows buyers to directly bid on the spot market power exchange and allows sellers to directly input asking prices for the power they supply so that the control node dynamically connects a buyer with the seller with the lowest asking price. If at a later time, another provider becomes available that has a lower asking price, the control node automatically switches to the new supplier. Of course, all dynamic spot market buyers will want the provider with the lowest asking price. Therefore, all the buyers connected to the control node may equally share the power from the provider with the lowest available asking price. In this scenario, each user is supplied by various suppliers. Alternatively, the buyers may share the power from one provider in which the size of the share is based on the size of the power requirement of each buyer. For example, if there are only two buyers and the first buyer requires twice the amount of power as the second buyer, the first buyer receives twice as much power from the provider with the lowest asking price as the second buyer.

In yet another embodiment, the buyers may be entitled to receive power from the lowest asking price provider based on some type of heirarchy or priority. For example, the buyer with the highest demand for power may have priority to the power from the provider with the lowest asking price. In this embodiment, the buyers with the highest demands receive power from the provider with the lowest asking price. Then the power of the provider with the second lowest asking price is distributed to those of the remaining buyers with the highest demands. This process continues until there is no available power left or until there is no demand left.

The invention is not limited by the embodiments described above which are presented as examples only but can be modified in various ways within the scope of protection defined by the appended patent claims.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for dynamically trading and distributing electric power, comprising the steps of:
   (a) collecting by a control node bids and asks from buyers and sellers of electric power;
   (b) dynamically matching by the control node the collected bids and asks to form matches;
   (c) receiving by the control node information related to current supply and demand conditions on an electric network through a feedback loop;
   (d) generating, by the control node, a route plan for routing electricity between the matched buyer and seller and for simultaneously balancing loads and resources of the electric network based on the supply and demand conditions received through the feedback loop; and
   (e) configuring the electric network to route electric power in response to the control node in accordance with the route plan.

2. The method of claim 1, wherein said step (e) of configuring includes switching the flow of electric power in the electric network.

3. The method of claim 1, wherein said step (e) further comprises dynamically effecting the route plan.

4. The method of claim 1, wherein said step (a) further comprises collecting the bids and asks in a spot market.

5. The method of claim 1, wherein said step (a) comprises collecting the bids and asks via a wide area network.

6. The method of claim 5, wherein said step (a) comprises inputting the bids and asks to the wide area network via respective buyer terminals and seller terminals.

7. The method of claim 1, wherein said step (e) comprises configuring an electric network comprising a high voltage direct current system.

8. The method of claim 1, wherein said step (b) comprises using the current supply and demand conditions received through the feedback loop for dynamically matching bids and asks.

9. The method of claim 8, wherein said step (b) comprises continuously updating the matches based on changes in the bids and asks.

10. The method of claim 1, wherein said step (b) comprises continuously updating the matches based on changes in the bids and asks.

11. The method of claim 10, wherein said step (b) further comprises matching an equal share of the power from a seller with the lowest asking price to all bids of buyers to which the power is available.

12. The method of claim 10, wherein said step (b) further comprises matching a share of the power from a seller with the lowest asking price to all bids of buyers to which the power is available, wherein the share is proportional to the amount of power demanded by the buyer.

13. The method of claim 10, wherein said step (b) further comprises matching the ask of the power from a seller with the lowest asking price first to the bids of buyers with the highest amount of power demanded.

14. A system for dynamically trading and supplying electric power, comprising a control node for receiving bids and asks from buyers and sellers, matching the received bids and asks to form matched bids and asks, and dynamically updating the matched bids and asks in accordance with changes occurring in the bids and asks, a feedback loop connected between the control node and an electric network, wherein the electric network is capable of routing electricity between buyers and sellers, said control node being configured for receiving information relating to current supply and demand conditions on the electric network through the feedback loop, generating a route plan for routing electricity between the matched buyer and seller and for simultaneously balancing loads and resources of the electric network based on the supply and demand conditions received through the feedback loop, and for activating switching devices connected to the electric network for switching a flow of electricity in the electric network to effect the generated route plan.

15. The system of claim 14, wherein said control node is connectable to a wide area network for receiving the bids and asks from buyers and sellers.

16. The system of claim 14, wherein said control node comprises a deal maker module for matching said bids and asks and a route planner module for planning the route for effecting the matched bids and asks.

17. The system of claim 16, wherein said control node comprises an accounting module connectable for determining the actual use of the buyer and determining the charge to the buyer.

18. The system of claim 14, wherein the electric network is a high voltage direct current system.

19. The system of claim 14, wherein said control node is configured to receive bids and asks in a spot market, and to dynamically match the bids and asks using the current supply and demand conditions received through the feedback loop.

20. The system of claim 14, wherein said control node is configured to dynamically generate the route plan.

* * * * *